United States Patent [19]

Hannani

[11] Patent Number: 4,577,304

[45] Date of Patent: Mar. 18, 1986

[54] DEVICE FOR CORRECTING AUDIO RECORD'S GROOVE ECCENTRICITY

[76] Inventor: Hamid Hannani, 327 S. 46th St., Philadelphia, Pa. 19143

[21] Appl. No.: 510,749

[22] Filed: Jul. 5, 1983

[51] Int. Cl.$^4$ .......................... G01B 7/00; G11B 25/04
[52] U.S. Cl. ........................................ 369/56; 369/53; 369/58; 369/263
[58] Field of Search ................... 369/53, 54, 55, 56, 369/58, 263; 33/174 Q

[56] References Cited

U.S. PATENT DOCUMENTS

| | | | |
|---|---|---|---|
| 2,977,125 | 3/1961 | Mallina | 369/56 |
| 3,000,005 | 9/1961 | Moyer | 369/58 |
| 3,103,364 | 9/1963 | Macks et al. | 369/263 |
| 3,556,537 | 1/1971 | Stacy | 369/255 |
| 4,012,048 | 3/1977 | Hawkins | 369/271 |
| 4,095,802 | 6/1978 | Horian et al. | 369/72 |
| 4,441,178 | 4/1984 | Kobayashi et al. | 369/263 |

FOREIGN PATENT DOCUMENTS 493586  10/1938  United Kingdom .................. 369/56

*Primary Examiner*—Steven L. Stephan

[57] ABSTRACT

A device for correcting audio record's groove eccentricity consists of an arm mounted on one end on a base and having on the opposite end a pin-like device which can track the audio record grooves. On this later end of the arm also mounts an extension arm. A monitoring device which has parallel marking lines on its top is placed under the free end of the extension arm. When the groove tracking device starts tracking the record grooves the eccentric rotation of the record grooves causes a left-right motion of the groove tracking means. This motion is then enlarged by the extension arm and displayed in relation to the parallel marking lines on the stationary monitoring device. Once the direction and amount of the eccentricity is depicted the turntable should be brought to a stop. To correct the eccentricity the record should be moved across its horizontal platter surface in the opposite direction where the maximum eccentricity was detected. To allow such movement of the record a reemer-type device can be used to enlarge the center hole of the record. Enlarging the record's central hole has two advantages: firstly, it allows a complete center error correction, secondly, the contact between the spindle and the record is thereby avoided and this causes the noises and vibrations which are ordinarily transmitted to the record through its contact with the spindle shaft to be eliminated.

8 Claims, 4 Drawing Figures

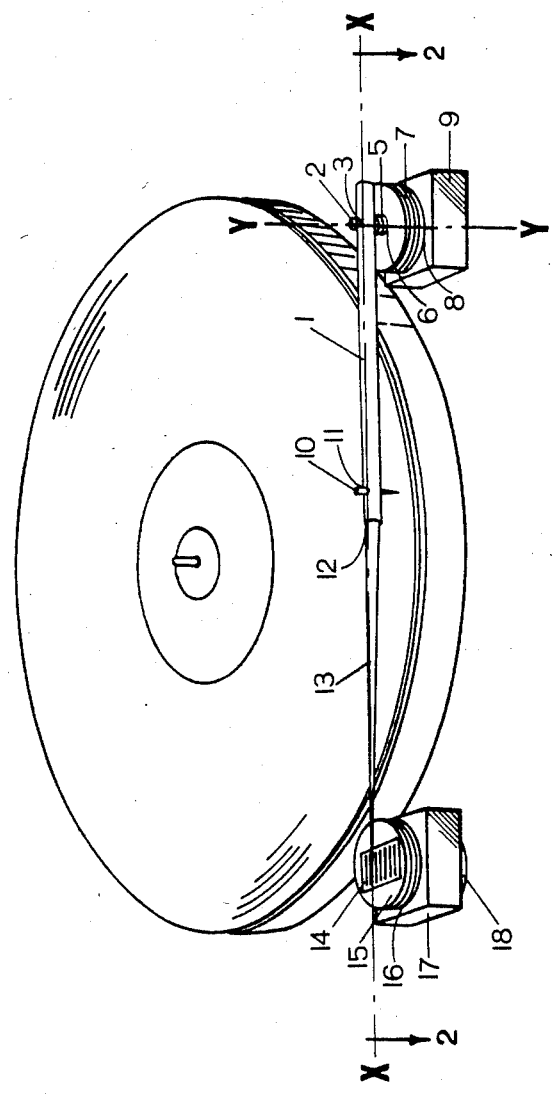
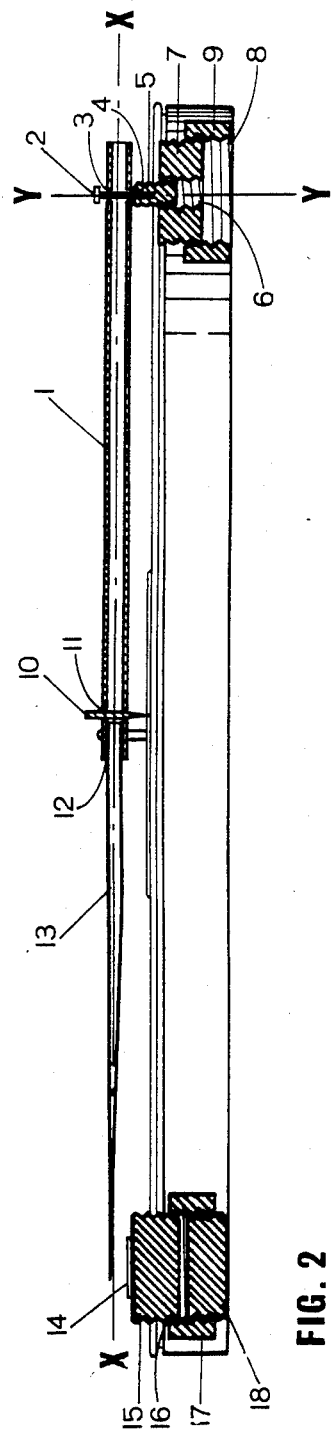
FIG. 1
FIG. 2

DEVICE FOR CORRECTING AUDIO RECORD'S GROOVE ECCENTRICITY

BACKGROUND OF THE INVENTION

1. Field of the Invention

This invention relates in general to devices for centering audio records on the platter of the turntables and in particular to devices for correcting the audio record's groove eccentricity.

2. Description of the Prior Art

The most common imperfection in audio discs is groove eccentricity. This kind of imperfection is caused mainly by three factors: (1) eccentric location of the record's central hole in relation to the record grooves, (2) oversized diameter of audio record's central hole, (3) undersized diameter of turntable's spindle shaft. It is apparent that these three factors can work against each other and add to each other's individual error. International standards require a maximum eccentricity error of 0.2 millimeters in audio records. However, the aggregate of the above mentioned factors can lead to an eccentricity error much higher than the above mentioned allowable eccentricity error of the record itself.

This type of eccentricity can cause distortion known as wow and flutter. The amount of the distortion produced by an eccentric record is significant. As a general rule, a doubling of a disc's eccentricity error leads to a doubling of wow and flutter in the reproduced sound. Even if all components of the record playing system are of high quality the distortions produced by an eccentric record cannot be overcomed and can significantly affect the quality of the sound reproduction. Accordingly, the results of a well-centered record are: reduced wow and flutter, reduced surface noise, improved frequency response, improved dynamic range, and improved stereo separation. The overall sonic improvement can be described as: added clarity and focusing of the sound, increased detailing, and stablized positioning of musical instruments and vocals in space.

Furthermore, in the ordinary procedures for centering a record on the turntable the record comes into physical contact with the turntable's spindle. This causes the vibrations of the moving parts of the turntable to be transmitted through the spindle shaft to the record and then picked up by the phono cartridge in form of noises and distortions. With respect to this problem another proposal provides a turntable with accoustic damping means to be positioned between the spindle pin and the spindle hole of the record in order to accoustically isolate the recording disc from the turntable's drive shaft. However, in this invention since the contact between the record and the spindle is not eliminated the vibrations transmitted to the record are merely reduced by the accoustic damping material and not totally eliminated. Furthermore, this proposal requires a turntable to be already built with this type of spindle means and cannot solve the problem for millions of turntables already made with a metal spindle shaft. On the other hand, using the object of my invention for centering a record and slightly enlarging the record's spindle hole the contact between the spindle and the record can be totally avoided and thereby the vibrations ordinarily transmitted to the record through the spindle shaft totally eliminated. Furthermore, my centering device and procedure can be employed for all turntables already in use without any changes or modifications in the turntable's components.

OBJECTS AND SUMMARY OF THE INVENTION

The object of this invention is to help the user correct the eccentricity error of the audio discs on the platter of the turntables and thereby eliminate the distortions produced by an eccentric record. A further object of the invention is to provide an alternative way of centering records on the turntables, independent of the center contact between the record and the turntable's spindle, thereby avoiding the noise produced by the contact between the record and the turntable's spindle shaft.

These objects are achieved, according to the invention by a device which can detect and visually demonstrate the eccentricity error of the audio discs in relation to their central position on the turntable's platter. Normally, when an audio disc is placed on a turntable's platter at least three factors, as outlined before, can affect and disturb its desired centricity. Therefore, at this point it is desirable to detect the amount and direction of the eccentricity error and thereby attempt in correcting it.

In this invention this object is achieved by providing an arm mounted on one end on a base and carrying on the opposite end a device for tracking the record grooves. On this later end of the arm also mounts an extension arm. A stationary monitoring device which has parallel marking lines on its top is placed under the free end of the extension arm, with the parallel marking lines positioned parallel to the longitudinal axis of the extension arm. The extension arm has a relatively narrow end on this side so that its horizontal movement can be detected with reference to the marking lines on the monitoring device. When the groove tracking means is placed on the record and the turntable is set in motion, the groove tracking means starts a left-right motion which is the result of the eccentricity error of the record grooves. This motion is enlarged by the extension arm and displayed in relation to the marking lines on the monitoring device. The amount and direction of this left-right movement of the extension arm is a reference to the amount and direction of the eccentricity error of the record grooves. As soon as the amount and direction of the eccentricity is detected the turntable should be brought to a stop. To correct the eccentricity the record should be moved across its horizontal platter surface in the opposite direction where the maximum eccentricity was depicted. A successful center error correction depends on an accurate amount and direction of moving of the record. The turntable is then set in motion again and this time the left-right movement should have been reduced or almost eliminated. A slow steady movement of the extension arm towards the inner grooves of the record is the indication of a well centered record. Normally it takes only a few trial and errors to achieve a good center adjustment.

Concerning the moving of the record across its horizontal platter surface, there is sometimes enough gap between the spindle and the record's spindle hole area to allow a desirable center adjustment. In these cases, by getting advantage of the relatively small sized spindle and the relatively large sized record hole, the record can be moved across in the desirable direction on the platter to correct the eccentricity error. However, sometimes in this procedure the inherent eccentric location of the record's central hole in relation to the record grooves is such that in order to center the record perfectly the center hole of the record must be slightly enlarged. This leads to a further advantage which is the second object of the invention. In ordinary procedures for centering a record on a turntable the record comes into physical contact with the turntable's spindle. This contact causes the vibrations of the turntable's moving parts to be transmitted through the spindle shaft to the record and then picked up in form of noises and distortions by the cartridge. Enlarging the center hole of the record and centering it by the object of this invention, the contact between the record and the turntable's spindle shaft can be avoided and thereby the noises and vibrations which are ordinarily transmitted to the record through its contact with the spindle shaft totally eliminated.

The record tracking means of this invention is made of a flexible material to prevent scratching the record grooves. In another embodiment the groove tracking means is substituted with a record cleaning device which can clean the record at the same time that it tracks the record grooves.

Further properties and advantages of the invention are apparent from the description in conjunction with the accompanying drawings.

BRIEF DESCRIPTION OF THE DRAWINGS

FIG. 1 is a perspective view of device for correcting audio record's groove eccentricity according to a typical embodiment of the invention.

FIG. 2 is a sectional view taken along the line 2—2 on FIG. 1, but with the turntable being shown in elevation.

DESCRIPTION OF THE PREFERRED EMBODIMENT

Figure 3:
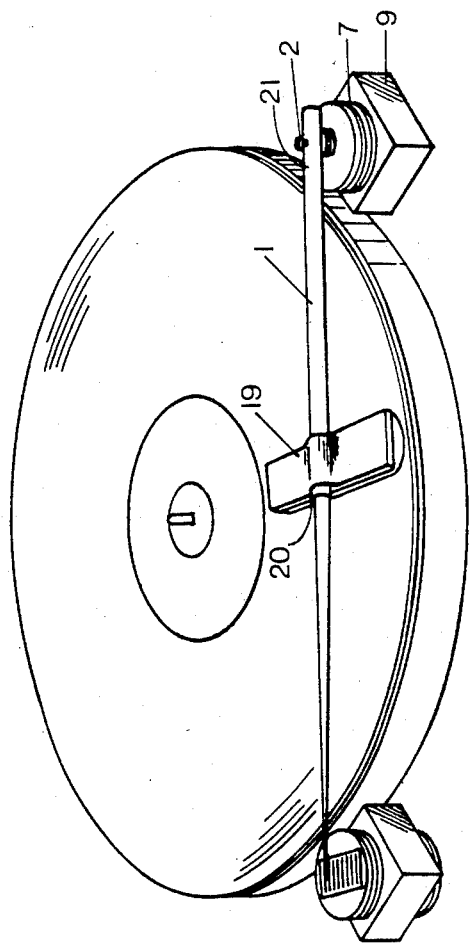
FIG. 3 is a perspective view of device for correcting audio record's groove eccentricity with an alternate form of groove tracking means.

For the purpose of promoting an understanding of the principles of the invention, references will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Refering to FIGS. 1 and 2, there is illustrated an arm 1 which is mounted on a base 9. The mounting means consists of a metal pin 2 passed through a clearance hole 3 in the arm 1 and inserted tightly into the hole 4 in a height adjustment shaft 5, with the longitudinal axis of the pin 2 coincident with the vertical axis Y—Y of the height adjustment shaft 5. The height adjustment shaft 5 is a cylinderical device with a screw type side area so that it can be connected to a height adjustment base 7 through an appropriately sized threaded clearance hole 6 in the height adjustment base 7 along Y—Y axis, said screw type connection allowing height adjustment of the height adjustment shaft 5 in relation to the height adjustment base 7. The height adjustment base 7 is also a cylinderical device with screw type side area which allows it to be connected to the base 9 through an appropriately sized threaded clearance hole 8 in the base 9 along the Y—Y axis, said screw type connection allowing height adjustment of the height adjustment base 7 in relation to the base 9. To increase the height of the arm 1 the height adjustment devices 5 and 7 can be screwed out; conversely, to decrease the height of the arm 1 the height adjustment devices 5 and 7 can be screwed in their corresponding threaded clearance holes 6 and 8.

Refering to FIG. 2, the metal pin 2 has a top part larger than the clearance hole 3 in the arm 1 so that this projected top part stops the arm 1 from coming out of the pin 2. The clearance hole 3 in the arm 1 is slightly larger than the pin 2 to allow free horizontal and some vertical movement of the arm 1. The height adjustment shaft 5 has a larger diameter than the hole 3 in the arm 1 so that it serves as a support for the arm 1.

Refering to FIGS. 1 and 2, the arm 1 carries on its unmounted end a groove tracking means 10. In this embodiment, there is a vertical clearance hole 11 near this end of the arm 1 through which the groove tracking means is passed and thereby connected to the arm 1. The tracking means 10 consists of a cylindrical element with a sharp end which can track the record grooves, and it is made of a flexible material such as soft plastic or hard cardboard to prevent scratching the record grooves. The tracking device 10 is inserted tightly through the vertical clearance hole 11 and can be moved up and down for the purpose of height adjustment. An extension arm 13 is approximately 6" long and is connected to the arm 1 along the X—X axis through the clearance hole 12. The arm 1 is a tube-like device providing the clearance hole 12 perpendicular to the X—X axis. The appropriately sized end of the extension arm 13 is inserted in the clearance hole 12, this type of connection also allowing length adjustment of the extension arm 13 depending on how far it is inserted inside the clearance hole 12. The distance between the hole 11 where the groove tracking means 10 is mounted and the end of the arm 1 where the extension arm 13 is attached provides allowance for the length adjustment of the extension arm 13. The extension arm 13 has a relatively larger diameter in its end where it is attached to the arm 1, and a relatively smaller diameter in the opposite end where it is used for detecting the movement of the arm 1 along the record grooves. The extension arm 13 can be removed from the arm 1 for easy carrying and storage of the device.

A monitoring device 14 consists of a plate having parallel markings on it and is attached to the top surface of a monitoring height adjustment base 15. This monitoring height adjustment base 15 is identical to the previously described height adjustment base 7 except it doesn't have the clearance hole 6. The height adjustment base 15 is connected through its screw type side area to a threaded clearance hole 16 of a base 17. The base 17 is identical to the previously described base 9. Another height adjustment base 18 is identical to the height adjustment base 15 and can be connected underneath the base 17 through the threaded clearance hole 16 in the base 17. To attain a relatively low position of the monitoring device 14 only the monitoring height adjustment base 15 must be used and screwed in the clearance hole 16. To attain a relatively high position of the monitoring device 14 the monitoring height adjustment base 15 should be in screwed out position, and to get additional height the monitoring height adjustment base 18 should be connected to the bottom of the base 17 through the clearance hole 16, as shown in FIGS. 1, 2, and 3.

Figure 4:
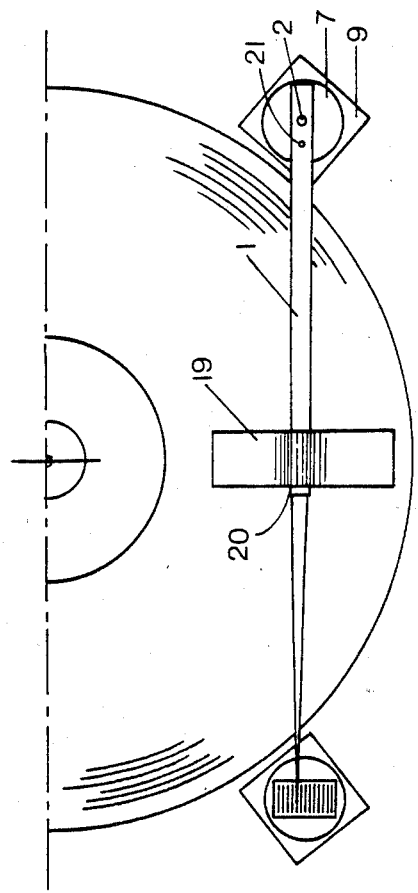
FIG. 4 is a top view of FIG. 3.

Refering to FIGS. 3 and 4, another embodiment consists of a record cleaning device 19 attached to the tracking side of the arm 1. The record cleaning device 19 comprises an upper part which has a clearance hole 20, through which it is connected to the arm 1, and a lower part which is made of a fabric with controlled-density fibers suitable for cleaning the record grooves. The fabric's fibers can fit inside the record grooves and together track the record grooves, at the same time clean them. Therefore, in this embodiment the record cleaning device 19 is substituted for the groove tracking means 10, as shown in FIGS. 3 and 4. A vertical clearance hole 21, similar in size to the previously described clearance hole 2, is provided in the arm 1 near the clearance hole 2, which allows a choice of the effective length of the arm 1 depending on which hole 2 or 21, is used for mounting the arm 1 on the base 9.

Although specific embodiments of this invention have been described in detail herein with reference to the accompanying drawings, it is to be understood that the invention is not limited to the specific embodiments described herein, and that various changes and modifications may be effected therein by one skilled in the art, for example various shapes, dimensions, connections, and materials can be changes, all within the scope or spirit of the invention as defined in the appended claims.

What is claimed is:

1. A method of positioning a record on a turntable in a concentric manner independent of a center contact between said record and said turntable's spindle shaft, comprising the steps of:

enlarging the center hole of said record so that the contact between said record and said turntable's spindle shaft is avoided;

rotating said record on said turntable and tracing a groove of said record by a groove tracking means;

enlarging the horizontal displacement of said groove tracking means so that said horizontal displacement can be visually detected in relation to a stationary monitoring device;

bringing said turntable to a stop at a maximum horizontal displacement of said groove tracking means;

repositioning said record in accordance with said concentric information so as to attain a concentric position of said record.

2. A method of positioning a record on a turntable in a concentric manner independent of a center contact between said record and said turntable's spindle shaft as set forth in claim 1, wherein said enlargement of said horizontal displacement of said groove tracking means is in a ratio of 2 to 1.

3. A method of positioning a record on a turntable in a concentric manner independent of a center contact between said record and said turntable's spindle shaft as set forth in claim 1, wherein said tracing of a groove of said record is attained by said groove tracking means mounted on a pivoted arm.

4. A method of positioning a record on a turntable in a concentric manner independent of a center contact between said record and said turntable's spindle shaft as set forth in claim 3, wherein said enlargement of said horizontal displacement of said groove tracking means is attained by means of an extension arm connected to said pivoted arm.

5. A method of positioning a record on a turntable in a concentric manner independent of a center contact between said record and said turntable's spindle shaft as set forth in claim 3, wherein said pivoted arm is mounted on a portable base.

6. A method of positioning a record on a turntable in a concentric manner independent of a center contact between said record and said turntable's spindle shaft as set forth in claim 1, wherein said enlarged horizontal displacement of said groove tracking means is displayed in the same direction as the horizontal displacement of said groove tracking means.

7. A method of positioning a record on a turntable in a concentric manner independent of a center contact between said record and said turntable's spindle shaft as set forth in claim 1, wherein said repositioning of said record is attained by utilizing the gap between said enlarged center hole of said record and said turntable's spindle shaft.

8. A method of positioning a record on a turntable in a concentric manner independent of a center contact between said record and said turntable's spindle shaft as set forth in claim 1, wherein said repositioning of said record is attained manually.

* * * * *